United States Patent [19]

Irrgang

[11] Patent Number: 4,634,565

[45] Date of Patent: Jan. 6, 1987

[54] METHOD AND APPARATUS FOR MANUFACTURING A PLASTIC INJECTION MOLDING, PARTICULARLY MOLDING STRIPS FOR AUTOMOTIVE VEHICLES

[75] Inventor: Manfred Irrgang, Wuppertal, Fed. Rep. of Germany

[73] Assignee: Gebr. Happich GmbH, Fed. Rep. of Germany

[21] Appl. No.: 735,444

[22] Filed: May 17, 1985

[30] Foreign Application Priority Data

May 17, 1984 [DE] Fed. Rep. of Germany ....... 3418275

[51] Int. Cl.[4] ............................................. B29C 45/14
[52] U.S. Cl. ..................................... 264/510; 264/276; 264/328.9; 264/513; 264/516; 425/116; 425/127
[58] Field of Search ............... 264/276, 544, 135, 510, 264/513, 516, 328.9; 425/116, 117, 127, 129 R, 387.1; 296/41

[56] References Cited

U.S. PATENT DOCUMENTS

| | | | |
|---|---|---|---|
| 3,493,458 | 2/1970 | Santangelo | 161/44 |
| 3,982,877 | 9/1976 | Wyeth et al. | 425/387.1 X |
| 4,336,009 | 6/1982 | Wolf | 264/276 X |
| 4,489,018 | 12/1984 | Ball | 425/117 X |

FOREIGN PATENT DOCUMENTS 66076695 12/1966 Fed. Rep. of Germany .
3020906A1 12/1980 Fed. Rep. of Germany .
3116339A1 12/1982 Fed. Rep. of Germany .
2076729A 5/1981 United Kingdom .

Primary Examiner—Donald Czaja
Assistant Examiner—Leo B. Tentoni
Attorney, Agent, or Firm—Ostrolenk, Faber, Gerb & Soffen

[57] ABSTRACT

An injection mold for producing a plastic injection molding having a layer of plastic molding material on the front of a metallic support. The injection mold has a first mold half over the front of the support with a mold cavity therein for holding the injected plastic material which forms the layer on the front of the support. The injection mold has a second mold half at the rear of the support with another recess for being filled with pressure fluid for pressing the front of the support against the first mold half, which seals the cavity for the injected plastic molding material to prevent leakage and to keep the line of the plastic material layer around the mold cavity on the support sharp. The pressure fluid may be supplied to the rear of the support before the molding composition is injected into the cavity at the front of the support. The pressure fluid at the rear of the support may be the same material that is applied on the front of the support. The recess in the second mold half at the rear of the support is adjacent but alongside the cavity defined in the first mold half above the front of the support, and their adjacent edges are either directly one above the other or each slightly overlaps the other recess.

14 Claims, 6 Drawing Figures

METHOD AND APPARATUS FOR MANUFACTURING A PLASTIC INJECTION MOLDING, PARTICULARLY MOLDING STRIPS FOR AUTOMOTIVE VEHICLES

BACKGROUND OF THE INVENTION

The present invention relates to a method of producing a plastic injection molding, particularly molding strips for automotive vehicles, in which a plastic injection molding composition is injected with high injection pressure into an injection mold and it deposits on and bonds to individual regions on at least the front side of a support which is inserted into the mold cavity of the injection mold, in order to form a molded plastic layer on the support. The invention also relates to an apparatus for carrying out this method which comprises a plastic injection molding machine having an injection mold between whose mold parts the support can be clamped. The half of the mold which supports the front side of the support has at least one recess which forms a mold cavity for the molded layer.

Frequently, in plastic injection molded parts, and particularly molding strips for automotive vehicles, the support must have regions which are free of deposited plastic material, and these plastic material-free regions must be developed with clean edges. If a strip of alloy steel, possibly pre-shaped, is used as the support, as is frequently the case in connection with molding strips for automotive vehicles, a plastic material-free region here serves solely in order to impart a decorative effect to the molding strip. Molding strips often have plastic material-free longitudinal strips which extend over practically the entire length of the molding strip, are of constant width over their entire length, and are known as "bright regions". It is difficult to manufacture molding strips with clean linear development at the edges of the plastic layer which define the "bright regions". The dificulties are due, first of all, to the sealing function between the edges of the mold cavity and the adjoining support surfaces of the corresponding mold part of the injection mold, which function must be satisfied exclusively by the support which is pressed by the closing pressure of the injection mold against the resting surfaces of the mold parts. Secondly, as a rule, the bright regions are provided on arched or otherwise curved regions of the molding strip, and these are regions in which deviations in tolerance can hardly be avoided in practice. Third, with molding strips, in order to avoid visible points at which the injected material has entered the molds through runner channels, the injection molding composition is injected through a runner channel at one end of the strip into the injection mold. This requires very high injection pressure, which may be more than 1,000 bars, depending on the length of the strip and its cross section. In accordance with the traditional manner of manufacture, if a support is inserted into the lower part of the mold, and the injection mold is closed, and plastic injection molding composition is injected under high pressure into the mold cavity of the upper mold part, then the pressure of application of the support against the resting surface of the lower mold part is increased. With even minimum deviations in the support due to tolerances, there will be a deformation of the support and a gap will form between the top of the support and the adjacent resting surface of the upper mold part, at the edge regions of the mold cavity. However, since the injection molding composition tries to fill up even the smallest spaces, courses more or less unclean course of plastic material form the edges of the bright regions after the removal of the injection molded part from the mold. Since unclean edges in the bright regions of the molding strips are extremely undesirable, costly additional operations must be carried out. As a result, the surface of the bare bright region is frequently damaged, i.e. scratched.

SUMMARY OF THE INVENTION

The object of the present invention is to assure that the edges between the plastic deposit on the support and the deposit-free regions can be produced absolutely clean, without requiring any additional working.

The method for attaining the above object in accordance with the invention comprises simultaneously with injecting plastic molding composition into the mold for bonding the composition onto the front side of the support, also acting upon the plastic material-free region of the support in the opposing direction, from the rear of the support, by a pressure fluid.

The invention overcomes the fact that supports which are free of tolerance defects for mass-produced articles, such as plastic injection molded parts in general and molding strips in particular, cannot be manufactured, at least not at reasonable cost. But, such deviations in dimension are unimportant if they occur in regions which, in any event, are provided with a plastic material layer. The invention therefore accommodates deviations in tolerance of the support through corresponding pressing of the support against the resting surface of that mold part that includes the cavity for the plastic material layer. This pressing is done by means of a suitable pressure fluid which acts on the back of the support to enable the support to fully perform its sealing function at its front side on which the plastic material layer is formed. The possible formation of a slot between the support and the resting surfaces of the mold parts not occurs on the rear of the support where it is harmless. This is particularly true if the rear of the support is acted on by a pressure fluid before the injection pressure acts on the front side.

The rear side of the support is preferably acted on with a pressure which corresponds at least to the injection pressure acting on the front side. In this way, the formation of a slot between the front side of the support and the mold part adjacent it is practically excluded.

One particularly preferred method step comprises using the plastic injection molding composition that serves for forming the plastic material layer also as the opposing pressure fluid. This enables acting also on the rear of the support by a pressure fluid that is supplied by one machine and with only one injection head.

It is advantageous to use a support which is coated by a bonding agent disposed exclusively in the region that is to be provided with the plastic material layer. This assures, on the one hand, an intimate bond of the plastic material layer to the support while, on the other hand, it makes it possible to withdraw the plastic material that has been coated onto the rear of the support from the support after the removal of the injection molding part from the mold, and to process the material further.

The apparatus for carrying out the above method comprises the first or lower mold part or mold half which supports the rear of the support having in the support resting region at least one recess which can be acted on by a pressure fluid and which laterally adjoins the injected deposit holding recess in the other, upper mold part. The additional recess enables a pressure fluid to act on the support from its rear and to thus press the support against the resting surface of the upper, second mold half for producing a reliable sealing effect. It is important that the additional recess be arranged laterally alongside of the recess which forms the mold cavity in the upper mold part. Otherwise, the support might experience deformation directed into the mold cavity.

The recess in the lower mold part which supports the rear of the support may have a slightly larger cross section of opening than the recess in the upper part for forming the mold cavity for the plastic material layer, whereby a certain advance of the pressure fluid on the rear of the support is obtained.

The recesses which are worked into the mold parts extend in a staggered arrangement and parallel to each other in the longitudinal direction of the injection mold. The recesses in the mold parts which are generally opposite each other can adjoin each other directly in each case at one edge or their adjacent edges can overlap slightly.

Other objects and features of the invention are described with reference to the drawings.

DESCRIPTION OF THE PREFERRED EMBODIMENTS

Figure 2:
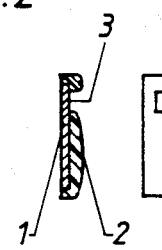
FIG. 2 is a section along line II—II in FIG. 1.
Figure 1:
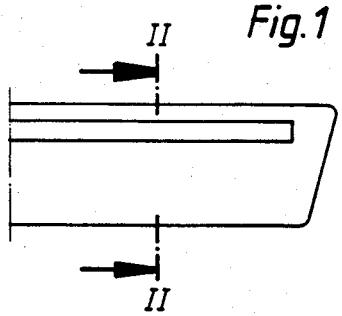
FIG. 1 is a top view of a plastic injection molding that is developed as a molding strip.

The plastic injection molding shown in FIGS. 1 and 2 is designed for use as a molding strip for vehicles, although it is not limited in its usefulness to this application. The molding comprises a support 1 with a plastic material layer 2 bound to it. The support 1 is comprised of a dimensionally stable material, for instance stainless alloy steel. The plastic material layer 2 is comprised of a plastic that is suitable for injection molding, preferably PVC. The support 1 has a plastic material-free or bare "bright region" 3, which extends, as shown in FIG. 1, as a longitudinal strip practically over the entire length of the molding strip. The manufacture of molding strips by an injection molding process affords the advantage that the subsequent application of closed strip ends is no longer necessary since fabrication of the molding strips can be completed in one operation.

Figure 3:
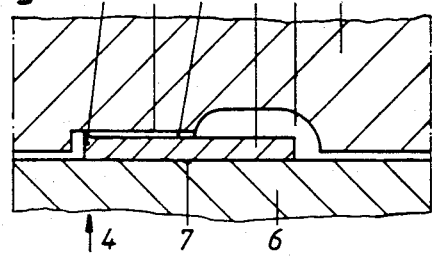
FIG. 3 is a vertical section through a prior art injection mold for the production of the molding strip of FIGS. 1 and 2, in traditional construction.

FIG. 3 shows a traditional prior art injection mold 4 for the manufacturing of a molding strip which is a variant of FIGS. 1 and 2. The mold 4 comprises an upper mold part or half 5 and a lower mold part of half 6 and the support 1 is positioned and held between the mold halves. The mold halves 5 and 6 have respective resting surfaces 8 and 7 for the front and rear sides, respectively, of the support 1. The upper mold half 5 has a recess defined in it which forms a mold cavity 9. A plastic injection molding composition (not shown) is injected with high pressure into the mold cavity 9 from one end of the mold through a runner channel (not shown) in order to form a plastic material layer 2 (not shown in FIG. 3, but see FIG. 1). If the front of the support 1 is not exactly parallel to the rear of the support, the resting surface 8 might not come into flat, parallel application against the front surface of the support, despite a high closing pressure of the mold halves 5 and 6. In the embodiment shown in FIG. 3, a deviation in tolerance is indicated by a somewhat exaggeratedly shown burr 10. As a result of such a deviation in tolerance, a slot 11 can be produced between the resting surface 8 and the top of the support 1. Upon the rejection of a plastic injection molding composition into the mold cavity 9, the injection molding composition necessarily also enters the slot 11. However, this is extremely undesirable since a plastic material-free bright region 3 is required here on the molding strip. Thus, after the removal of the molding strip from the mold, the region having excess plastic material must be removed with the aid of cutting tools. This not only requires a large amount of time and labor, but it can also lead to damage to the surface of the support.

Figure 4:
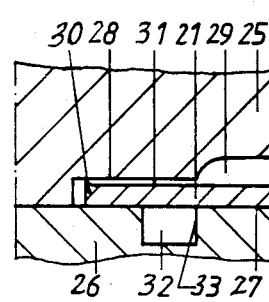
FIG. 4 is the same type of vertical section through an injection mold according to the invention for the production of the molding strip of FIGS. 1 and 2.

FIG. 4 shows a first embodiment of an injection mold 4 which bears similarities to the one shown in FIG. 3 and in which corresponding parts have been provided with the same reference numbers raised by 20. The support 21 is held in the mold cavity. The main difference in the injection mold 24 from that of FIG. 3 is that in the lower mold half 26 in FIG. 4 a recess 32 is provided, which interrupts the resting surface 27 for the support. One longitudinal edge 33 of this recess 32 is aligned with the longitudinal edge of the mold cavity 29 which adjoins the bright region of the support 21, i.e. the recess 32 adjoins an imaginary vertical connecting line on the right and the mold cavity 29 adjoins it on the left. The recess 32 extends parallel to the mold cavity 29 and over the length of the injection mold 24. By means of pressure fluid, this builds up on the rear of the support 21 a pressure which acts on the rear of the support so that the front side of the support is pressed against the resting surface 28 of the upper mold half 25. This prevents the formation of a slot, like 31, and thus it prevents emergence of the plastic injection molding composition from the mold cavity 29. It has been shown in tests that the injection molding composition which is used for the formation of the plastic material layer 22 is also suitable as a presure fluid.

Figure 5:
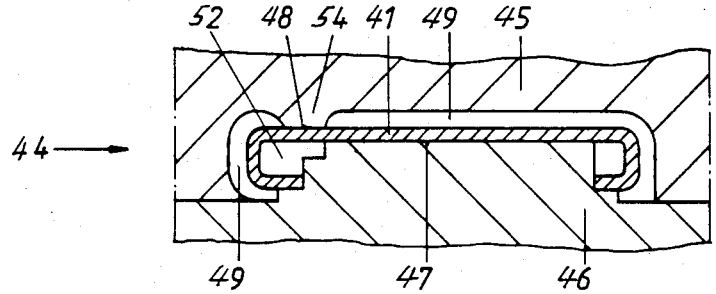
FIG. 5 is a vertical section through a first modified embodiment of the injection mold according to the invention.

The injection mold 44 of FIG. 5 is slightly modified as compared with that in FIG. 4. Reference numerals for elements corresponding to those in FIG. 3 have been raised by 40. The mold 44 also has an upper mold half 45 and a lower mold half 46, as well as a subdivided mold cavity 49 for the formation of a plastic material layer 42 for the support 41 held in the mold cavity, which in this case is of C-shaped cross section. The projection 54 of the mold half 55 interrupts the mold cavity 49 for forming the bright region of the molding which is to be kept free of plastic material. In order that this bright region might be produced with dependably clean edges, a recess 52 is provided between the rear of the support and the resting surface 47 of the mold half 45. The recess 52, as described above with respect to recess 32 in FIG. 4, can be filled with a pressure fluid in order to press the support 41 against the resting surface 48 of the projection 54.

Figure 6:
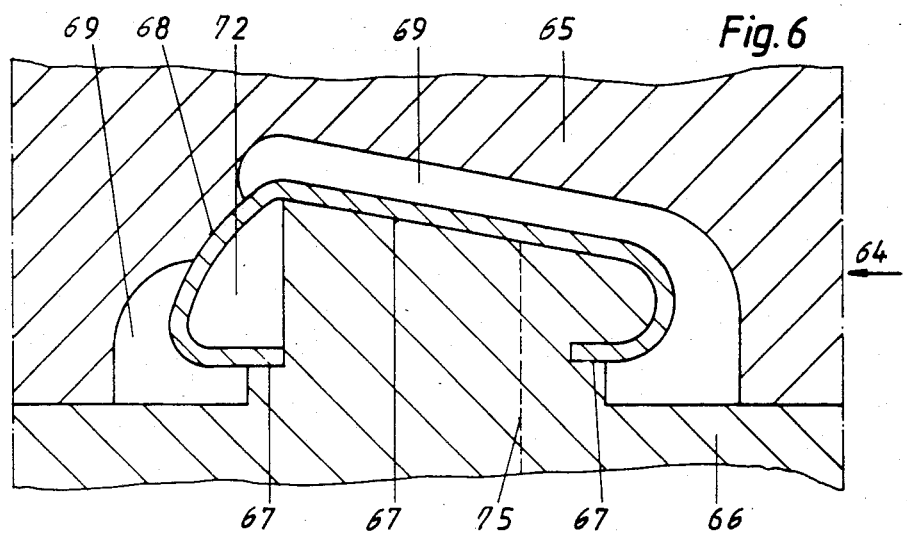
FIG. 6 is a vertical section through a second modified embodiment of an injection mold according to the invention.

An injection mold 64 similar to that shown in FIG. 5 is shown in the embodiment of FIG. 6. Reference numerals for elements corresponding to those in FIG. 3 have been raised by 60. In this case also, the injection mold 64 has an upper mold half 65 and a lower mold half 66 for partial injection around an approximately C-shaped support 61 held in the mold cavity. The mold halves 65 and 66 have respective resting surfaces 68 and 67. The resting surface 68 which supports the front side of the support 61 forms the bright region on the support, while the divided mold cavity 69 determines the shape for the deposit 62. To assure that the support 61 comes into absolutely tight application against the resting surface 68, a recess 72 which can be filled with a pressure fluid is also provided. For purposes of the removal of the finished molding strip from the mold, the lower mold half 66 is developed in two parts, as indicated by the dashed line 75.

In the embodiment shown in FIG. 4, the recesses 29 and 32 have, in each case, one longitudinal edge which are on opposite sides of the support but which adjoin each other, one directly beneath the other. In the embodiments shown in FIGS. 5 and 6, in contrast, a certain overlap of the recesses 49 and 69, on the one hand, and 52 and 72, on the other hand, is provided, and the adjoining edges of the two recesses each slightly overlap the opposite recess.

Although the pressure invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A method of manufacturing a plastic injection molding comprising:
   inserting a support, having a front side and a rear side, into a mold cavity of an injection mold;
   injection a plastic injection molding composition with high pressure into the mold cavity for forming a layer of the plastic material on at least the front side of the support; but not on a region of the front side which is free of the plastic material; and
   during the injecting of the composition, supplying pressure fluid against the rear side of the support, generally to the rear of the plastic material-free region of the front side, for urging the plastic material-free region against the mold part thereover for preventing the plastic material composition from flowing onto the plastic material-free region.

2. The method of claim 1, wherein pressure fluid is supplied against the rear of the support before the injecting of the plastic material compositions into the cavity is begun.

3. The method of claim 1, wherein the pressure fluid is supplied to the rear of the support at a level of pressure which correspond at least to the injection pressure into the cavity.

4. The method of claim 1, wherein the plastic material composition that is injected into the cavity is the same plastic material composition as the pressure fluid.

5. The method of claim 1, further comprising, on the front side of the support, coating only the region on which plastic material composition is to be applied with a bonding agent before the composition is injected into the mold cavity.

6. A plastic injection molding machine comprising:
   an injection mold including a top mold part and a bottom mold part between which a support for plastic injection molding composition can be positioned and held;
   the top mold part, which is for being over the front of the support, having a first support region which supports the front of the support; a first recess formed in the first support region and defining a mold cavity over the front of the support for receiving injected plastic injection molding composition under high pressure and the composition being for applying a layer of plastic material to the front side of the support in the mold;
   the bottom mold part, which is for being over the rear of the support, having a second support region which supports the rear of the support; a second recess formed in the second support region for being filled with a pressurizing fluid that acts against the rear of the support and presses the support against the first support region of the upper mold part; the second recess laterally generally adjoins the first recess;
   with the proviso that the top mold part support region has a sealing section that is shaped for contacting the front of the support and, as a result of such contact, for defining a region contacted by substantially all of said sealing section from which coating composition can be excluded.

7. The machine of claim 6, wherein the second recess has a larger cross section than the first recess.

8. The machine of claim 6, wherein the mold has a longitudinal direction; both recesses extending parallel to each other and in the longitudinal direction of the mold, the recesses also extending staggered with respect to each other.

9. The machine of claim 8, wherein each of the first and second receses has a respective edge which is directly beneath the edge of the other recess as the recesses are staggered.

10. The machine of claim 8, wherein each of the first and second recesses has a respective edge which slightly overlaps and is beneath the other recess as the recesses are staggered.

11. The machine of claim 6, wherein each of the first and second recesses has a respective edge which is directly beneath the edge of the other recess as the recesses are staggered.

12. The machine of claim 6, wherein each of the first and second recesses has a respective edge which slightly overlap and is beneath the other recess as the recesses are staggered.

13. The machine of claim 6, wherein the second recess is opposite the top mold part support region sealing section.

14. The method of claim 1, further comprising
   providing a top mold part over the front side of the support; and placing a sealing section of the top mold part in sealing contact with the support at substantially all points in the region of the front side of the support which is free of the plastic material; and
   urging the plastic material-free region against the sealing section of the top mold part by said step of applying pressure fluid against the rear side of the support.

* * * * *